(12) United States Patent (10) Patent No.: US 7,987,822 B2
Fishman et al. (45) Date of Patent: Aug. 2, 2011

(54) ELECTROMECHANICAL FAILSAFE THERMOSTAT

(75) Inventors: Joseph Fishman, Scarborough (CA); Eli Elkayam, Bialik (IL)

(73) Assignee: Fishman Thermo Technologies Ltd., Misgav Post (IL)

( * ) Notice: Subject to any disclaimer, the term of this patent is extended or adjusted under 35 U.S.C. 154(b) by 348 days.

(21) Appl. No.: 12/165,874

(22) Filed: Jul. 1, 2008

(65) Prior Publication Data

US 2009/0173295 A1 Jul. 9, 2009

(30) Foreign Application Priority Data

Jan. 8, 2008 (CA) .................................... 2617149

(51) Int. Cl.
*F01P 5/10* (2006.01)
*F16K 31/44* (2006.01)
*F01P 7/02* (2006.01)

(52) U.S. Cl. .................. 123/41.44; 123/41.1; 236/34.5; 251/249.5; 251/250

(58) Field of Classification Search ............... 123/41.44, 123/41.1, 41.02, 41.01, 41.08; 236/34, 34.5, 236/90, 74, 75, 84, 101 C; 251/129.12, 129.11, 251/249.5, 250

See application file for complete search history.

(56) References Cited

U.S. PATENT DOCUMENTS

| 4,550,693 | A | * | 11/1985 | Saur | 123/41.1 |
| 4,674,679 | A | * | 6/1987 | Saur | 236/34.5 |
| 4,836,497 | A | * | 6/1989 | Beeson | 251/80 |
| 4,848,652 | A | * | 7/1989 | Kennedy | 236/34.5 |
| 4,895,301 | A | * | 1/1990 | Kennedy | 236/34.5 |
| 5,529,282 | A | * | 6/1996 | Lebkuchner | 251/129.12 |
| 5,971,288 | A | * | 10/1999 | Davis et al. | 236/68 R |
| 6,145,538 | A | * | 11/2000 | Park | 137/554 |
| 6,471,184 | B1 | * | 10/2002 | McIntosh | 251/321 |
| 6,595,165 | B2 | | 7/2003 | Fishman | |
| 6,598,565 | B2 | | 7/2003 | Fishman | |
| 6,742,716 | B1 | * | 6/2004 | Duprez et al. | 236/34.5 |

* cited by examiner

*Primary Examiner* — Michael Cuff
*Assistant Examiner* — Hung Q Nguyen
(74) *Attorney, Agent, or Firm* — Hoffmann & Baron, LLP

(57) ABSTRACT

An apparatus for controlling a temperature for an engine by controlling a flow of a liquid engine coolant through a coolant conduit, the apparatus including a thermostat having a temperature responsive valve for substantially blocking and substantially unblocking the flow of the liquid coolant to a radiator. The valve opens as the temperature of the liquid coolant rises and a spring urges the valve to a closed position as the temperature of the fluid falls. An electromechanical actuator is provided outside of the conduit and is controlled by an engine control system in response to engine conditions. It is connected to the valve by a connector assembly extending between the electromechanical actuator and the valve through the coolant conduit, the connector assembly being positioned relative to the valve to cause the spring to be compressed as the electromechanical actuator opens the valve so that the valve is opened and closed in response to a coolant temperature by said thermostat and positioned within a range of travel by said electromechanical actuator.

17 Claims, 4 Drawing Sheets

ELECTROMECHANICAL FAILSAFE THERMOSTAT

FIELD OF THE INVENTION

This invention relates generally to the field of internal combustion engines and more particularly to the cooling systems used to control the heat generated by such combustion engines. Most particularly, this invention relates to thermostats used to control the flow of the coolant around an engine and between an engine and a heat exchanger such as a radiator.

BACKGROUND OF THE INVENTION

Thermostats have been known and used extensively to control the circulation of coolant in internal combustion engines. In the past, the thermostats have taken the form of valves which are immersed in the coolant in, for example, a coolant conduit. Most commonly the valves include a valve member which spans the conduit and sits against a valve seat. Thus, in the closed position the valve substantially blocks the flow of coolant, for example, to the radiator, forcing the coolant to re-circulate within the engine to heat up more quickly.

Typically such valves include a closed body containing a thermally expandable material such as wax, where the closed body is immersed within the coolant fluid. As the fluid temperature rises the wax expands, thrusting out a piston. The piston lifts the valve off the valve seat to allow the coolant to circulate down a new path, such as past a heat exchanger or radiator. This lowers the temperature of the coolant and removes heat from the engine. A spring is provided to urge the valve to a closed position so that in the resting or cooled state the valve is normally closed. Thus, when an engine is first started, the valve will be closed allowing the engine to attain its optimum running temperature more quickly by preventing the circulation of the radiator fluid outside of the engine.

Thermostats, to date, have been designed to permit the engine to operate over time at a constant optimum temperature. The thermostat accomplishes this by opening a valve in the cooling system when the engine temperature, and thus the liquid coolant temperature, rises. Opening the valve permits more flow to a heat exchanger such as a radiator, permitting more heat to be dissipated, which in turn can lower the engine temperature. As the engine temperature drops, and thus the coolant temperature drops, the valve closes, reducing the amount of heat dissipated and again maintaining an optimum operating temperature.

Such prior art thermostats are effective, simple and reliable, but suffer from several drawbacks. One is that the thermostat essentially requires the engine designer to set one optimum engine temperature. However, in practice, the engine operating temperature is known to affect engine performance. Specifically, a hotter running engine produces less in the way of emissions, by permitting more complete combustion which in turn improves fuel economy. A hotter running engine will deliver less power, while a cooler running engine delivers more power. Thus, any single optimum engine temperature is a compromise between power and emissions.

Another drawback is that thermostats are slow to respond. The coolant temperature change is fairly gradual and since the change in coolant temperature controls movement of the piston, the valve only opens slowly. Essentially the response of the thermostat lags the engine demand and thus acts as a dampened system. For example, it might take the thermostat 12 minutes to respond in winter when the engine start is very cold, and about 5 minutes in summer where the engine start temperature is warmer. Sharp changes in engine temperature which arise and then recede quickly are not well managed by the thermostat. However, such sharp changes may occur, for example during acceleration from a stop, when accelerating to pass, or when climbing a hill. Therefore there has been an effort to develop a thermostat which responds, on demand, rather than simply passively following coolant temperature. Of course, such a more responsive thermostat still needs to reliably respond to coolant temperature changes in a manner which prevents overheating.

Various levers and actuators have been proposed to open and close valve elements on demand, but these suffer from various disadvantages. Firstly, they are relatively expensive. Secondly, they involve complex mechanical moving parts which interface with a complex engine control system either of which can fail over time. A failed actuator system could lead to the valve remaining in one position, such as being closed, which in turn could lead to overheating and failure of the engine, which is unacceptable. Thus, electromechanical systems have certain drawbacks.

The present inventors have proposed a thermo-mechanical solution in two prior U.S. patents, namely, U.S. Pat. Nos. 6,598,565 and 6,595,165. These prior patents teach inventions based on a combination of a thermostat valve for blocking and unblocking the flow of fluid, with a thermally activated actuator operatively connected to the valve. The actuator is positioned so as to be partly within the coolant so as to maintain the thermal activation part of the actuator at about the coolant temperature, when not being activated. A separate heater with an electronic heater control is connected to the actuator to cause the temperature of the actuator to be controlled to effect controlled displacement of the piston and thus to permit opening and closing of the valve on demand.

However, while providing an adequate response time in certain circumstances, the performance of the thermo-mechanical actuator is somewhat hindered by the time lag between the need to open the valve and the time needed to change the temperature of the thermally expansive material via the heater. In addition, the teachings require the use of two different actuation temperatures for the valve and for the thermal actuator, which increases the manufacturing complexity and costs. Additionally, the action of the thermo-mechanical actuator is bimodal, in that it is either open or closed—establishing a valve position corresponding to a partially open setting for the fluid flow is difficult to do. What is desirable therefore is a device which is capable of opening and closing the valve on demand, is relatively immediately responsive to short term engine demands, can be used to control the position of the valve to establish a partially open valve position, is reliable and easy to manufacture and avoids the drawbacks of the prior art systems. Most preferably such a device would be safe and would not be likely to fail in a manner that would cause engine overheating, in other words would include a fail safe configuration.

SUMMARY OF THE INVENTION

What is needed therefore is a controllable thermostat system which on the one hand is readily controlled by an engine control system to permit rapid valve position response to short duration peak loads and yet which still responds in a safe and reliable way to changes in coolant temperature to prevent overheating. The present invention most preferably includes a certain redundancy or fail safe capacity so that the system can even respond, to vary the valve position in response to fluid temperature, even in the event part of the system fails. In this way, in the event that one portion of the device ever fails, the redundant but independent portion can still be active to prevent engine damage through overheating. An aspect of the system is to include two elements which function independently, but both influence to location of the valve relative to the valve seat to provide fluid and thus engine temperature control. Further the system should be made from inexpensive components which are reliable, safe and simple to install. The system preferably includes an ability to quickly open the valve in response to engine demand to permit precise engine temperature control during somewhat rapid changes of load, such as going up a hill or passing or accelerating where more power is required. In this manner the system will permit the engine temperature to be lowered quickly and on demand, to deliver more power. Preferably the system also permits the valve to be returned to a more closed preferred steady state position, once the demand for power has passed to let the engine operate at high temperatures, to reduce emissions and increase efficient use of fuel. The device should also respond rapidly to precisely position the valve at any point in a range of positions to permit the engine temperature to be rapidly and precisely controlled.

Therefore, according to a first aspect of the present invention there is provided an apparatus for controlling a temperature for an engine by controlling a flow of a liquid engine coolant through a coolant conduit, the apparatus comprising:

a thermostat having a temperature responsive valve for substantially blocking and substantially unblocking the flow of said liquid coolant to a radiator, said temperature responsive valve responding to a temperature of said liquid coolant within said conduit and having a spring urging the valve to a closed position and a thermally actuated piston to open the valve as the temperature of said liquid coolant rises;

an electromechanical actuator mountable outside of said conduit and controlled by an engine control system; and a connector assembly extending through said coolant conduit between said electromechanical actuator and said valve, said connector assembly being positioned relative to said valve to cause said spring to be compressed as said electromechanical actuator opens said valve in response to engine demand.

BRIEF DESCRIPTION OF THE DRAWINGS

Reference will now be made to drawings which depict, by way of example only, preferred embodiments of the invention and in which.

DETAILED DESCRIPTION OF THE PREFERRED EMBODIMENTS

Figure 1:
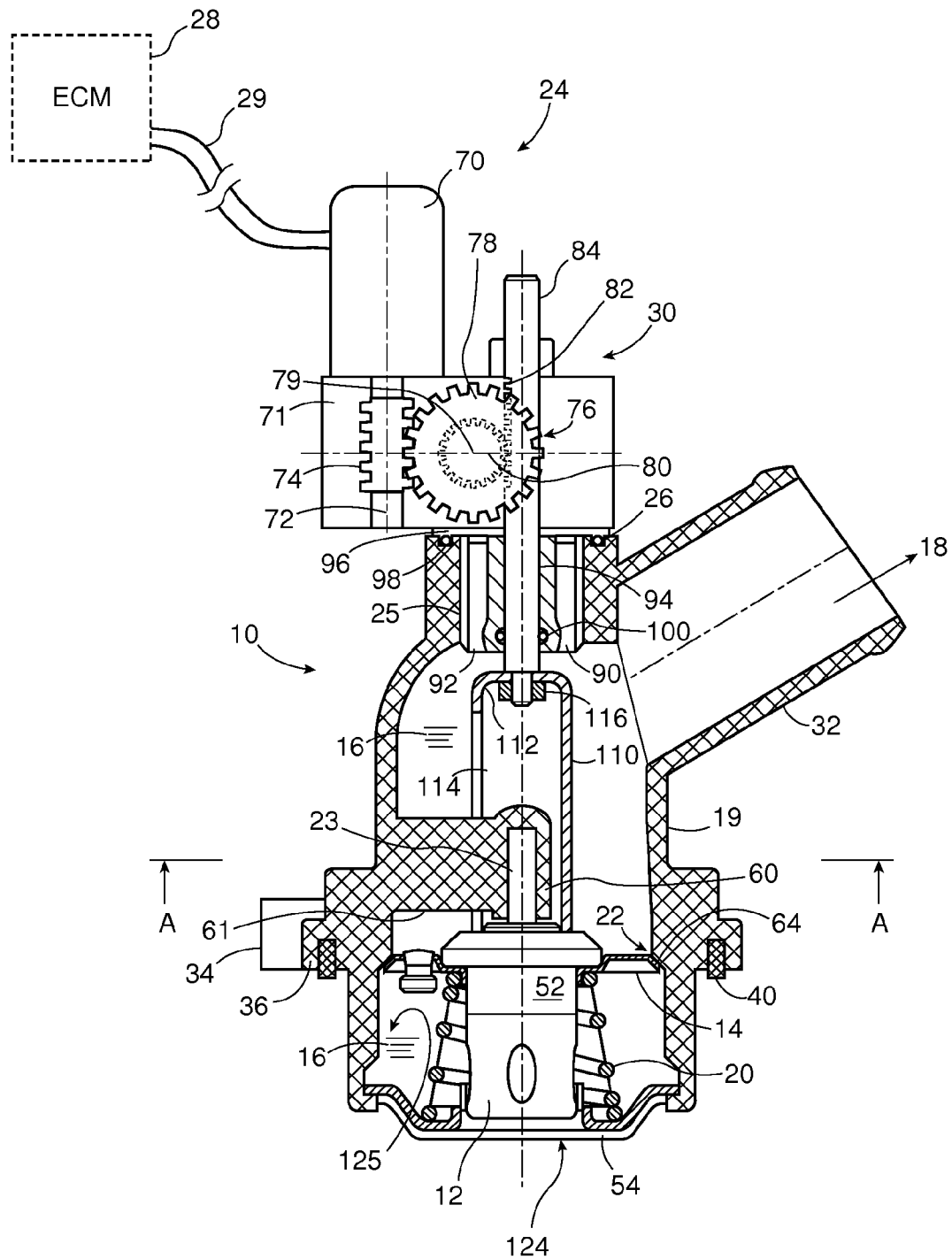
FIG. 1 is a cross-sectional view of the present invention in place in a coolant conduit with the valve closed.

An apparatus for controlling a temperature of an engine by controlling a flow of liquid engine coolant is illustrated generally as 10 in FIG. 1. The apparatus 10 includes a thermostat 12 which has valve 14 for substantially blocking and substantially unblocking the flow of a liquid coolant 16 to a radiator (not shown) in direction of arrow 18 through a coolant conduit 19. The temperature responsive thermostat 12 opens and closes the valve 14 in response to a temperature of the liquid coolant 16 within the conduit 19 by means of a thermally actuated piston 23 which opens the valve 14 as the temperature of the coolant fluid 16 rises. The thermostat 12 also has a spring 20 urging the valve 14 to a closed position 22 as the coolant cools.

The apparatus 10 also includes an electromechanical actuator 24 mounted outside of the conduit 19 at 26 and controlled by an engine control system 28 through control wires 29. Although electrical wires 29 are shown it will be understood that the electromechanical actuator 24 can communicate with the engine control system in any number of ways, including wireless, optical or other means of communication, but an electrical wiring connection is preferred for simplicity, reliability of connection and ease of use.

The apparatus 10 also includes a connector assembly 30 extending between said electromechanical actuator 24 and said valve 14 through an opening 25 in the coolant conduit 19, the connector assembly 30 being positioned relative to the valve 14 to cause said spring 20 to be compressed as said electromechanical actuator 24 opens said valve 14 through said connector assembly 30. Having described the main components in general outline the details of each individual component can now be more clearly understood.

The apparatus 10 is housed within an engine coolant cap assembly 32 which includes an attachment flange 34, and a main body 36 which defines the fluid conduit 19. The main body 36 includes an attachment flange 38 having a pair of opposed fastener openings (not shown) for attaching the assembly onto the engine cooling system of, for example, a vehicle. An elastomeric sealing ring 40 is provided to permit a liquid tight seal to be made between the assembly 32 and the remainder of the engine system. Although a particular configuration for the end cap assembly is shown, it will be appreciated that various forms of fitting could be used without departing from the present invention, providing the components of the assembly 10 are accommodated as described below. What is required is to attach the assembly to the engine in such a way so that a conduit connection is established with a heat exchanger such as a radiator, with a valve positioned across the conduit to control the flow of liquid coolant to the radiator and with a thermostatic valve positioned on the engine side of the conduit to permit the valve to sense and respond to the engine temperature.

Associated with the engine (not shown) is a motor instrumentation package of the sort that is commonly used to monitor conditions and performance of vehicle engines. As the details of such instrumentation packages will be familiar to those skilled in the art they are not described in any more detail herein. Electrical leads 29 are most preferably connected to an electrical circuit controlled, for example, by an Engine Control Module (ECM) 28. Typically the ECM 28 will include a plurality of sensors which are used to sense various engine and vehicle parameters so the performance of the engine can be optimized. The present invention comprehends either using existing sensors, if appropriate and available, or using added sensors to provide the ECM with sufficient information to take advantage of the present invention as described herein.

As can now be understood the thermostat 12 is essentially a conventional thermostat which will be familiar to those skilled in the art which includes a body 52 containing a thermally expandable material, a mounting bracket 54, the valve 14 and the spring 20 extending between the mounting bracket 54 and the valve 14, and the piston 23. Also shown in FIG. 1 is a receptacle 60 into which piston 23 fits. The receptacle 60 extends from the side of the coolant cap assembly on arm 61 and is fixed in place and thus acts as a thrust surface for piston 23. Also shown is an angled valve seat 64 against which the valve 14 seals. An important characteristic of the valve seat 64 is that the opening is sized and shaped so that as the valve 14 is further displaced from the valve seat 82, the more flow of coolant to the heat exchanger is permitted, up to a maximum flow rate. The operation of these components is explained in more detail below.

The electromechanical actuator 24 includes an electric motor 70 in a motor housing 71 having an output shaft 72. The electric motor 70 can be caused to rotate in forward and reverse directions to cause the output shaft 72 to also rotate in forward and reverse directions. A worm gear 74 is mounted onto the motor output shaft 72 and interacts with a gear assembly 76 having a large gear 78 and a small gear 80. The large gear 78 is operatively connected to the worm gear 74 so that rotation of the worm gear causes the gear assembly 76 to rotate about a centre of rotation 79. The small gear 80 is fixed to and rotates with the large gear 78 about the centre of rotation 79. The small gear 80 is in turn operatively connected to a toothed rack 82 on a rod 84. As the gear 80 turns the rod 84 is extended and retracted. The diameter of the first and second gears will depend upon the specific needs of the assembly and the gear ratio required. Reasonable results have been obtained where the small gear is about one half the diameter of the large gear.

A rod seal 90 is used to permit the rod 84 to extend into the coolant conduit 19 without permitting the coolant to leak out of the conduit 19. The rod seal 90 is sized and shaped to fit within the opening 25 formed in the conduit 19. The rod seal 90 includes a plug portion 92 and a sleeve 94. Most preferably the plug portion 92 is formed as an extension 96 to the motor housing 71, and includes a seal 98 to prevent leaks between the motor housing 71 and the conduit opening 25. The sleeve 94 is secured within the plug portion 92 and also includes a seal 100 to prevent coolant leaks. Most preferably the sleeve 94 is formed from a low friction material, such as plastic or nylon, to reduce friction and prevent the rod from binding during movement. Such material must be compatible with radiator coolant liquids of course. As can now be understood what is required is an assembly of components which permits the rotational motion of the electrical motor to be translated to axial or linear motion of the rod through the wall of the conduit. While the present design has been found to provide reasonable results there are other variations which will be apparent to those skilled in the art which can accomplish the same objectives.

At then end of the rod 84 distal from the electromechanical actuator 24 is a thrust connector 110. The thrust connector 110 is in the form of an elongated tube, which is closed at one end 112 and which has a slot 114 formed along one side. The end 112 includes an opening 116 through which the rod 84 extends. A nut 116 or other fastener can be used to secure the rod 84 to the thrust connector 110. The slot 114 is sized and shaped to permit the thrust connector to be mounted over the arm 61. The arm 61 can act as a guide to ensure that the movement of the thrust connector stays aligned as it is moved up and down by the rod 84. Most preferably the end 119 of the thrust connector 110 distal to the rod 84 is sized and shaped to seat against the body of the thermostat 52 to which the valve 14 is attached, on an opposite side of the spring 20. In this way the motion of the electromechanical actuator 24 can be translated into linear displacement of the valve 14 off the valve seat 64. Extension of the rod 84 into the conduit 19 pushes the valve 14 down off the valve seat 64, and retraction of the rod 84 permits the spring 20 to cause the valve 14 to return towards and to engage the valve seat 64.

Figure 2:
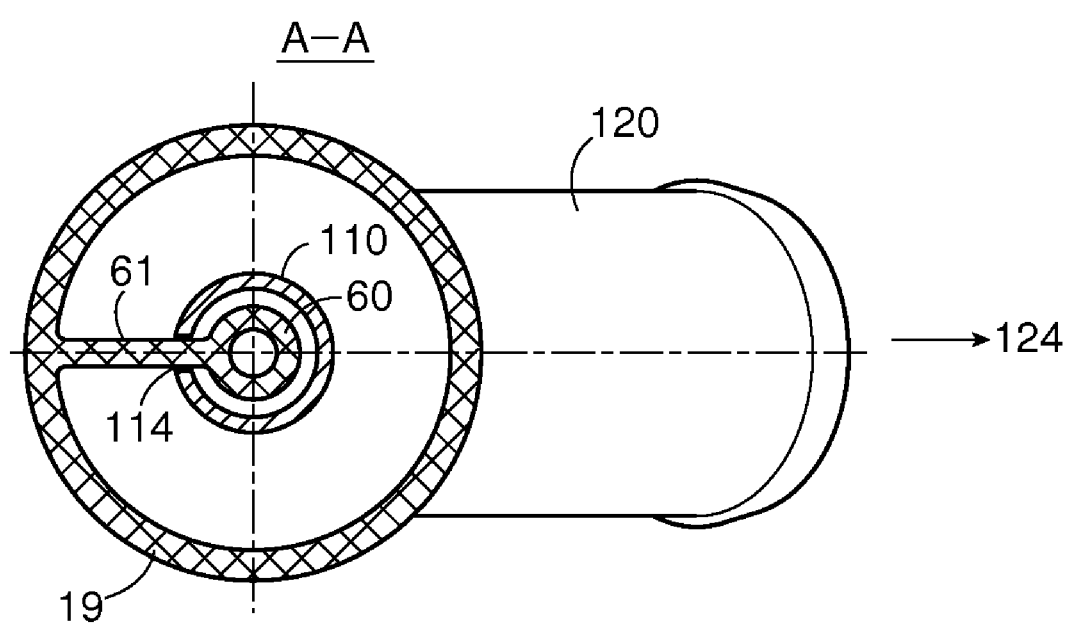
FIG. 2 is a sectional view along lines A-A of FIG. 1.

Turning to FIG. 2, a cross-sectional view along lines A-A of FIG. 1 is shown. The conduit 19 is shown with the fixed arm 61 and the receptacle 60. The slot 114 on the thrust connector 110 is shown closely fitting over the arm 61. From this view it can be appreciated that the thrust connector does not engage the thermostat around its full circumference owing to the slot 114. However, enough of the circumference is engaged, to permit a load transfer which is aligned and well enough supported to cause the valve to move smoothly onto and off the valve seat. It will be noted that from FIGS. 1 and 2 that the conduit 19 includes a Y-connection 120 which will permit coolant to circulate to a radiator (not shown). Thus arrow 122 shows location of a radiator, and arrow 124 shows the inflow of coolant into conduit 19 from the engine (not shown). In FIG. 1 the arrow 125 shows the coolant not passing past valve 14, which is closed onto valve seat 64. FIG. 1 shows the position of the valve 14 when the coolant and engine are cold and there is no engine load. In this circumstance, the valve 14 is closed against the valve seat 64 blocking the flow of coolant from the engine to the radiator. This permits the coolant to recirculate within the engine allowing the engine to achieve its desired operating temperature more quickly (shown by the arrow 125 in FIG. 1).

Figure 3:
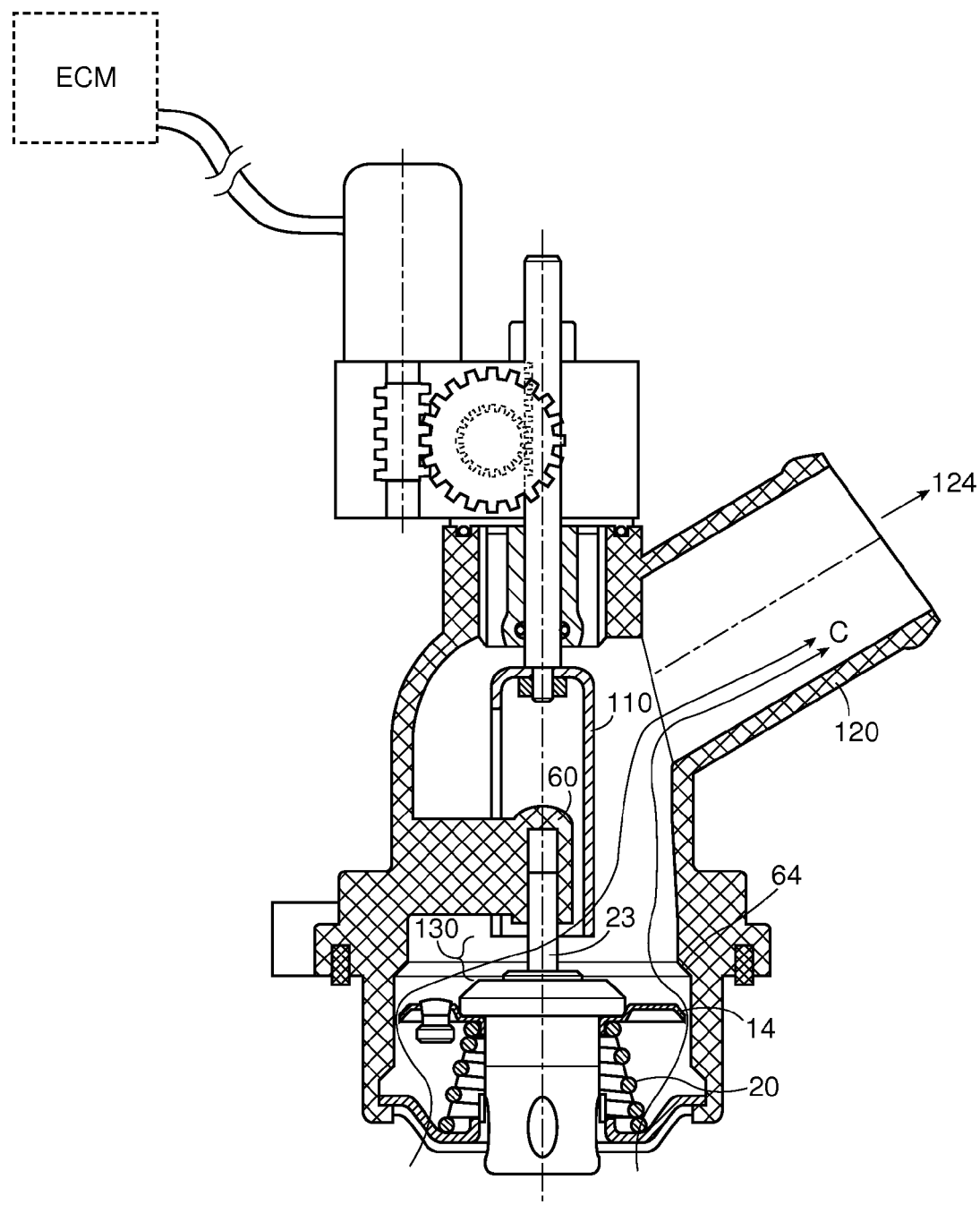
FIG. 3 is a cross-sectional view of the present invention in place in a coolant conduit with the valve open in a first mode.
Figure 4:
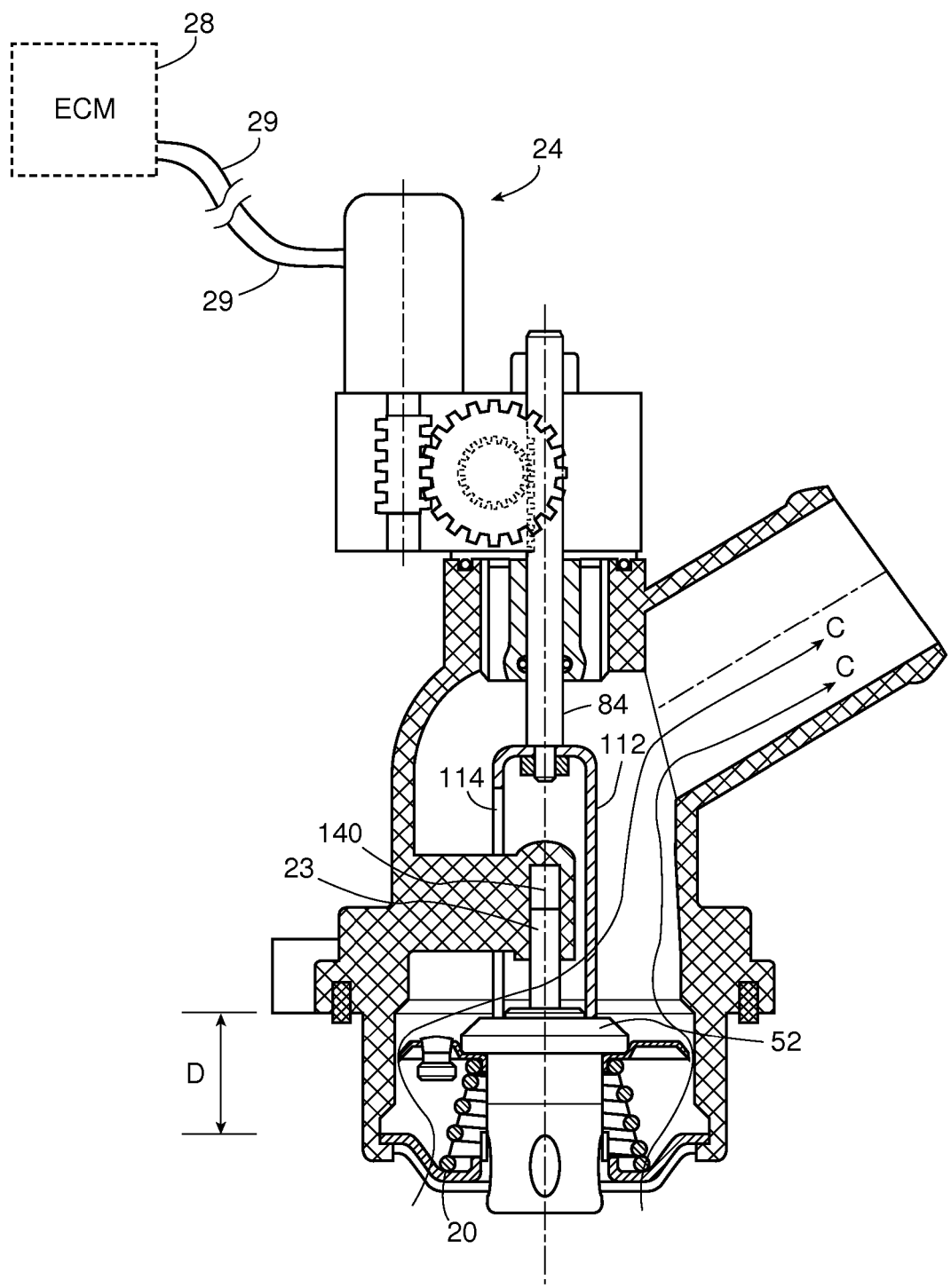
FIG. 4 is a front cross-sectional view of the present invention in place in a coolant conduit with the valve open in a second mode.

Turning now to FIGS. 3 and 4, it can be seen that the valve 14 has moved off the valve seat 64 allowing the coolant to circulate through the heat exchanger such as a radiator. However, each of FIGS. 3 and 4 demonstrate a different condition. Turning to FIG. 3 first, it demonstrates a condition where the engine had warmed the coolant fluid enough so that the temperature of the coolant has reached the activation temperature of the thermally expandable material in thermostat causing it to expand and thereby causing the piston 23 to extend. Since the piston 23 abuts a fixed thrust surface in the receptacle 60, the extension of the piston 23 forces the valve 14 downwardly and off the valve seat 64 compressing the spring 20. In this position the coolant can flow past the valve 14 and out into the radiator through the limb 120 of the conduit as shown by arrows C. It will be noted from FIG. 3 that although the valve 14 has opened, the thrust connector 110 has not moved and as a result a gap 130 exists between the thrust connector 110 and the valve 14. In the event coolant temperature drops below the thermal activation point for the thermostat, the thermally expansible material will contract, the piston 23 will retract and the spring 20 will cause the valve 14 to close onto the valve seat 64, thereby reducing heat dissipation and allowing the engine temperature to begin to heat up again.

As can now be appreciated and similar to the teachings of U.S. Pat. Nos. 6,598,565 and 6,595,165 the temperature activation range of the thermostat 50 can be set to any desired range, even a range above the normal range for mass produced vehicles. Thus, where typically a thermostat is set to begin to respond at a temperature of between 90° C. and 95° C., in the present invention a higher preferred activation temperature of between about 100° C. to 105° C. can be used. Most preferably the temperature activation range will cause a steady state temperature which is significantly hotter than a conventional system. This encourages more complete combustion, less emissions and a greater fuel economy for significant savings. The size of the benefit will depend upon the operating characteristics of the specific motor.

FIG. 4 shows the configuration of the present invention when the rather than running hotter than in the past it is desired to quickly cool the engine to enhance the delivery of power or the like. In this case the ECM will sense a demand that is translated into a need for more engine power. More power can come from a quick cooling of the motor fluid. This can be accomplished by a quick deployment of the thrust connector to push the valve 14 off the valve seat 64 by actuation of the electro mechanical motor assembly 24. By turning the motor, the worm will turn, turning the gear assembly 76 and extending the rod 84. As noted previously, this will occur as a result of particular conditions existing in the engine load, such as an acceleration or other circumstance which creates a need for more power, and hence more cooling as determined by the ECM. The thrust connector 110 transfers the load from the rod 84 to the shoulders of the thermostat body 52 causing the valve disk 14 to be displaced away from the valve seat 64 against spring 20. This permits the liquid coolant to circulate past the thermostat 12 shown as arrows C and to the radiator through the y-leg 120.

As can be seen in FIG. 4, the extension of the rod 84 moves the valve 14 and compresses the spring 20. Further, the movement of the rod 84 is independent of the coolant fluid temperature meaning that the piston 23 of the thermostat 12 has not moved within body 52 creating a gap shown at 140 between the piston 23 and the receptacle 60. As can now be appreciated the electromechanical actuator 24 permits the valve 14 to displaced off the valve seat 64 by any desired amount. The motor can be almost instantly activated to advance or withdraw the rod 84, leading to the precise and rapid location of the valve at any position along the linear range of displacement travel D of the piston. According to the present invention the position of the valve along the range of displacement can be set in accordance with the engine demand sensed by the ECM to permit enough coolant flow to permit the engine temperature to be lowered as needed. Further, the lowering of the temperature is preferred to occur rapidly, to achieve rapid cooling of the engine as the displacement is almost instantaneous. Most preferable the range of displacement of the valve corresponds to a coolant flow rate of from about zero (with the valve closed) to about 8 to 12 cubic meters (at the full extension) of flow per hour for a conventional mid sized car. As will be appreciated by those skilled in the art, other car types and other engine sizes may require more or less coolant flow. Thus, whereas the thermostat 12 controls the fluid flow to the radiator in essentially a bimodal fashion, of being either closed when cold to being extended a set amount once activation temperature has been achieved, the electro mechanical actuator can be used to position the valve along a range of positions to permit a range of flows for different cooling in accordance with engine demands or loads. Unlike our prior patent which requires about 6 seconds to react, the present invention can react much faster, in less than a second and most preferably in less than one tenth of a second, for improved performance.

Another aspect of the present invention is that the electromechanical system is independent from any temperature of the coolant and only reacts to instructions from the ECM. Thus, problems associated with high under the hood engine compartment temperatures, or other extraneous thermal influences is eliminated. The ECM will direct the position of the valve relative to the valve seat in accordance with engine demand and can be programmed to optimize engine performance. Even in the event of a failure of the thermostat 12 the ECM will still be able to displace the valve off the valve seat to achieve the desired engine temperature through coolant flow regulation, whether under a load situation or even at steady state conditions. Thus, the ECM acts as a failsafe system for the passive thermostat. On the other hand, if in the event the ECM fails for some reason, or there is a problem with the actuation of the rod 84, the thermostat 12 can still act to reliably control the opening and closing of the valve to achieve the desired engine running temperature. As a passive system, the thermostat 12 needs no electrical instructions and only reacts to the fluid temperature in accordance with its design. As such the thermostat acts as a second valve opening system which can act as a failsafe to the ECM controlled valve opening. As such, the present invention provides an electromechanical active system and a thermally activated passive system, which are redundant to one another to provide a greater measure of reliability of overall performance. In this sense the present invention provides a failsafe design.

It can now be appreciated that the valve 14 can be made to open enough to cause temperatures of coolant which are lower than the range of the normal operating temperatures set by a conventional thermostat. In circumstances where more power is required, it may be desirable to lower the temperature to a power delivering temperature. A preferred range for delivering power is between 50° C. and 100° C. and a narrower range of between 70° C. and 90° C. can also be used. This lowering of the engine temperature can be accomplished simply by the engine control module energizing the electric motor for almost instant and significant displacement of the valve 14 to open the same. In this case the valve 14 can be opened to permit the temperature to be lowered and a burst of power to be delivered. Alternately, it is also known that a higher set point temperature permits the engine to operate with reduced emissions, at better fuel economy but with reduced power. This compromise has resulted in lower steady state operating temperatures than might otherwise be desirable to reduce emissions. The linear actuator of the present invention permits engine operation at a higher running temperature for the purpose of reducing emissions, because any lack of power can be compensated for by a rapid temperature reduction, on demand, as explained above.

It will be appreciated by those skilled in the art that the foregoing description relates to preferred embodiments of the invention by way of example only. Various modifications and alterations of the invention have been suggested above and others will be apparent to those skilled in the art which still fall within the scope of the appended claims. What is presented by this present invention is an electromechanical valve opening assembly which is very quickly responsive to short time horizon events, which is combined with a thermally activated long time horizon passive valve opening assembly. Because each assembly operates by a completely different set of parameters, the failure of one will be compensated for by the other.

The embodiments of the invention in which an exclusive property or privilege is claimed are defined as follows:

1. An apparatus for controlling a temperature for an engine by controlling a flow of a liquid engine coolant through a coolant conduit, the apparatus comprising:
   a thermostat having a body containing a thermally expandable material and a temperature responsive valve attached to said body for substantially blocking and substantially unblocking the flow of said liquid coolant to a radiator, said temperature responsive valve responding to a temperature of said liquid coolant within said conduit and having a spring urging the valve to a closed position and a thermally actuated piston to open the valve as the temperature of said liquid coolant rises;
   an electromechanical actuator mountable outside of said conduit and controlled by an engine control system in response to engine conditions; and
   a connector assembly extending through said coolant conduit between said electromechanical actuator and said valve, said connector assembly being positioned relative to said valve to cause said spring to be compressed as said electromechanical actuator opens said valve wherein said valve is opened and closed in response to a coolant temperature by said thermostat and positioned within a range of travel by said electromechanical actuator in response to engine demand, wherein said connector assembly includes a thrust connector sized and shaped to seat against said body of said thermostat whereby motion of the electromechanical actuator is translated into linear displacement of said valve, and wherein said thrust connector is in the form of an elongated tube having a slot formed along one side thereof, wherein the slot is sized and shaped to permit said thrust connector to be mounted over an arm fixing in place a receptacle into which said piston fits.

2. An apparatus for controlling a temperature of an engine by controlling a flow of a liquid engine coolant as claimed in claim 1, wherein said connector assembly includes a gear assembly to translate motor rotation into linear displacement of said connector assembly.

3. An apparatus for controlling a temperature of an engine as claimed in claim 2 wherein said gear assembly includes a worm gear which interacts with a rotary gear.

4. An apparatus for controlling a temperature of an engine as claimed in claim 3 wherein said rotary gear interacts with a rack on a rod, wherein said rod is advanced and retracted by rotation of said rotary gear.

5. An apparatus for controlling a temperature of an engine as claimed in claim 1 wherein the connector assembly extends through said conduit through a leak tight stopper.

6. An apparatus for controlling a temperature of an engine as claimed in claim 1 wherein said spring is configured to return said valve to a closed position.

7. An apparatus for controlling a temperature of an engine as claimed in claim 6 wherein said electromechanical actuator is configured to displace said connector assembly independent of a temperature of said liquid coolant.

8. An apparatus for controlling a temperature of an engine as claimed in claim 7 wherein electromechanical actuator displaces said connector assembly and said valve to a specific position within a range of movement.

9. An apparatus for controlling a temperature of an engine as claimed in claim 8 wherein said specific position is determined by said engine control system based upon engine load.

10. An apparatus for controlling a temperature of an engine as claimed in claim 9 wherein said electromechanical actuator can open said valve even if said temperature sensitive valve function fails.

11. An apparatus for controlling a temperature of an engine as claimed in claim 9 wherein thermostat can open said temperature sensitive valve even if said electromechanical actuator fails.

12. An apparatus for controlling a temperature of an engine as claimed in claim 1 wherein said electromechanical actuator can open said valve in less than one second.

13. An apparatus for controlling a temperature of an engine as claimed in claim 1 wherein said electromechanical actuator can open said valve in less than one tenth of one second.

14. An apparatus for controlling a temperature of an engine as claimed in claim 13 wherein a first rate of coolant flow is between about 1 and 2 cubic meter per hour.

15. An apparatus for controlling a temperature of an engine as claimed in claim 13 wherein a second rate of coolant flow is about 10 cubic meter per hour.

16. An apparatus for controlling a temperature of an engine as claimed in claim 1 wherein said temperature sensitive valve opens enough to establish a control temperature of between about 102 and 112 degrees C.

17. An apparatus for controlling a temperature of an engine as claimed in claim 16 wherein said electromechanical actuator opens said valve enough to lower said liquid coolant temperature to between about 50 degrees C. and about 100 degrees C.

* * * * *